Nov. 11, 1952          W. B. PRIDY          2,617,677
PIPE SLING
Original Filed Oct. 18, 1948
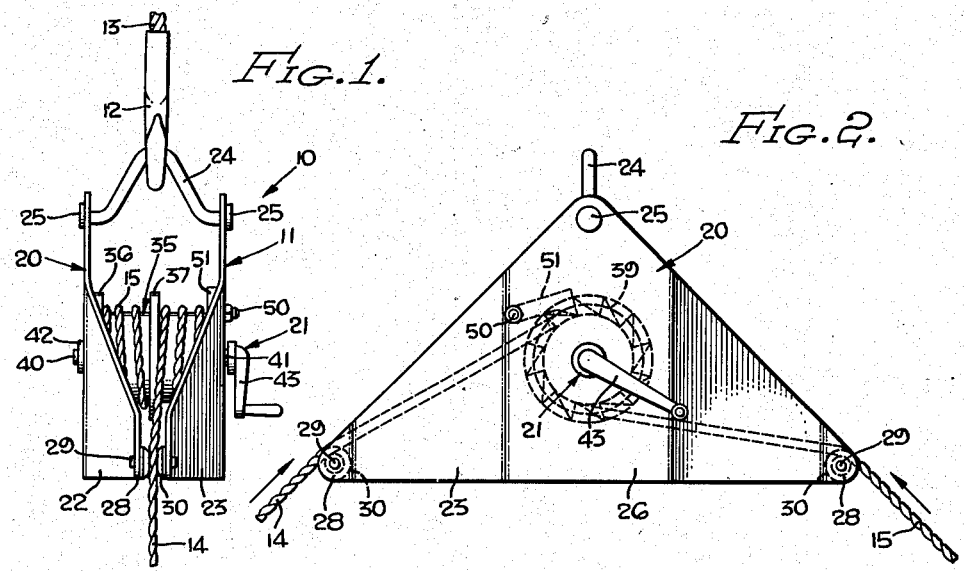
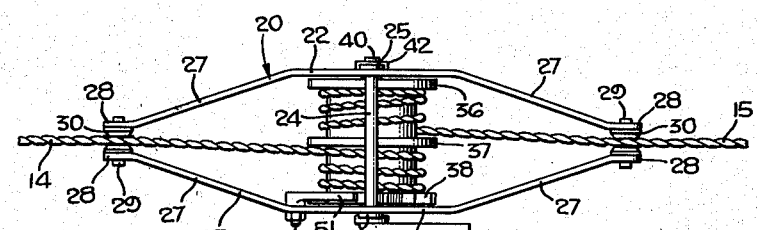
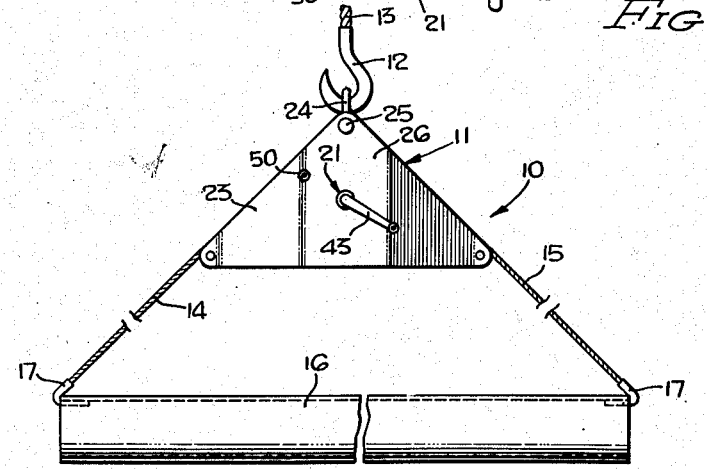
WHETSTINE B. PRIDY,
INVENTOR.
BY
ATTORNEY Patented Nov. 11, 1952

2,617,677

UNITED STATES PATENT OFFICE 2,617,677

PIPE SLING

Whetstine Buck Pridy, Long Beach, Calif.

Original application October 18, 1948, Serial No. 55,099. Divided and this application July 31, 1951, Serial No. 239,546

1 Claim. (Cl. 294—74)

This invention relates to a hoisting device and pertains particularly to pipe slings.

It is common practice to handle lengths of heavy pipe such as are used in deep wells by means of a sling which connects opposite ends of a pipe with the hoisting cable by which the pipe is carried from place to place. These slings include a ring, which is placed over the hook at the lower end of the hoisting cable, and strands of cable the upper ends of which connect to said ring and the lower ends of which have hooks which hook into opposite ends of the pipe to be lifted. As the pipes vary considerably in length it is necessary to have slings with cable strands of different lengths to accommodate the sling to various lenghs of pipe.

It is an object of the present invention to provide a pipe sling which may be readily manipulated to vary the length of the cable strands connecting the sling to the pipe ends whereby this sling may be readily accommodated to any length of pipe within the variety of these which must be handled ordinarily in a pipe storage yard.

This application is a division of my co-pending application Serial No. 55,099 filed October 18, 1948 on a Pipe Sling.

The manner of accomplishing the foregoing object as well as further objects and advantages will be made manifest in the following description taken in connection with the accompanying drawings in which Fig. 1 is an end elevational view of a preferred embodiment of my invention.

Fig. 2 is a side elevational view of Fig. 1 indicating the manner in which the pipe supporting strands of cable are adjusted in length manually in the operation of said pipe sling.

Fig. 3 is a plan view of Fig. 2.

Fig. 4 is a diagrammatic view in side elevation illustrating the manner in which the pipe sling of my invention is employed in hoisting a length of heavy pipe.

Referring specifically to the drawings, my invention is there shown as embodied in a sling 10 which includes a sling block 11 the latter being adapted to be suspended on a hook 12 of a hoisting cable 13 and to have strands of cable 14 and 15 adjustably secured thereto for hoisting a length of pipe 16 the cables 14 and 15 being provided with hooks 17 on their outer ends which are hooked in opposite ends of pipe length 16 as shown in Fig. 4 when the pipe sling 10 is employed in lifting said length of pipe.

The sling block 11 includes a frame 20 on which is mounted a double winch 21. Frame 20 comprises a pair of like triangular side plates 22 and 23 which are in the form of isosceles triangles, with bases substantially longer than the adjacent sides, and with the apices of said triangles joined by a yoke member 24 which is freely rotatable in a pair of aligned holes formed in said apices and has heads 25 formed on its opposite ends for uniting said side plates. The plates 22 and 23 have flat central portions 26 and converging opposite end portions 27 the tips 28 of which are bent into parallelism and provided with aligned apertures for receiving pins 29 opposite ends of which are swaged to unite said tips 28 of the plates 22 and 23. Spacing said tips and freely rotatable on said pins are small flanged pulleys 30.

The winch 21 of the sling block 11 includes a double drum 35 having flanges 36, 37 and 38 the latter having teeth 39 cut therein so that said flange constitutes a ratchet wheel. The drum 35 has trunnions 40 and 41 which extend through and journal in suitable aligned bearing holes in the plates 22 and 23 thereby rotatably mounting the drum 35 on these plates. Fixed on the trunnion 40 is a collar 42 while the trunnion 41 has fixed thereon a crank 43 for manually rotating the drum 35.

Pivotally supported on the plate 23 by a bolt 50 is a pawl 51 which is in a position to gravitate into locking relation with one of the teeth 39 so as to prevent counterclockwise rotation of the drum 35 as shown in Fig. 2.

In assembling the pipe sling 10, the free ends of the cables 14 and 15 are introduced over the pulleys 30 and between the plates 22 and 23 and are secured, at approximately the points on the drum 35 at which they are shown tangent respectively thereto in Fig. 2, to inner faces of the flanges 36 and 38.

Lengths of pipe ordinarily handled in a storage yard vary in length from 10 ft. to 45 ft. and the strands of cable 14 and 15 of the pipe sling 10 are long enough so that regardless of the length of the pipe length being handled the effective length of these strands may be adjusted by manipulation of the winch 21 so that cable strands 14 and 15 always incline downwardly as shown in Fig. 4 along lines lying approximately in the same planes with the adjacent sides of the triangular side plates 22 and 23 as shown in Fig. 4. As a result of this mode of operation, there is never an excessive strain placed on the cables 14 and 15 nor upon the pulleys 30 or the sling block frame 20. The major portion of the strain is thus transmitted from the cables 14 and 15 to the winch 21 and from this vertically through the trunnions 40 and 41 and the plates 22 and 23 to the yoke 24. Thus fairly heavy pipe lengths can be lifted by the pipe sling 10 with the rather light frame 20 shown in the drawings.

Another important advantage of the invention is the elimination of the necessity of carrying around a number of pipe slings with cable strands of different lengths for handling pipes varying in length. The pipe sling 10 may be handily used by one man by lifting the pawl 51 and pulling the cables 14 and 15 outwardly to slightly over the length necessary to handle a given length of pipe, manually placing the hooks 17 in opposite ends of this pipe and then returning to the sling block 11 and actuating the winch 21 manually to take up any slack in the cable lengths 14 and 15, whereupon the hoist is actuated to raise the hook 12 thus hoisting this pipe length suspended on the pipe sling 10.

Still another advantage of my invention is the facility with which the yard man may actuate the winch 21 to wind up the cables 14 and 15 entirely on the winch drum 35 on opposite sides of the flange 37, it being convenient, in doing this, to hook the hooks 17 over the pulleys 30 and lock these in place by dropping the pawl 51 behind one of the ratchet teeth 39. With the cables 14 and 15 thus compactly wound into the pipe sling 10, the latter may be stored or carried from place to place on the end of the hoisting cable without the cables 14 and 15 or the hooks 17 thereon becoming entangled with equipment in the storage yard.

The claim is:

A pipe sling comprising a frame including spaced triangular side plates, a yoke connecting said side plates at their apices and pins connecting lower tips of said plates, the latter being bent from flat middle portions of said plates to converge into closely spaced relation at said tips; pulleys freely rotatable on said pins; a winch drum disposed between middle portions of said plates and having trunnions which journal in aligned holes in said plates; a crank fixed on one of said trunnions for rotating said drum; a ratchet wheel formed on said drum; a pawl rotatably provided on one of said plates and optionally engaging said ratchet wheel; a pair of cables having corresponding ends thereof secured to said drum, said cables then running outwardly and downwardly over said pulleys, the latter being located a substantial distance below the axis of said drum; and hooks attached to outer ends of said cables at equal distances from said pulleys when said cables are taut.

WHETSTINE BUCK PRIDY.

REFERENCES CITED

The following references are of record in the file of this patent:

UNITED STATES PATENTS

| Number | Name | Date |
|---|---|---|
| 199,955 | Box | Feb. 5, 1878 |
| 859,812 | Harness | July 9, 1907 |
| 1,175,883 | Feingold | Mar. 14, 1916 |

FOREIGN PATENTS

| Number | Country | Date |
|---|---|---|
| 70,867 | Switzerland | Dec. 31, 1914 |